June 23, 1931. J. B. HEID 1,811,627
FRACTIONATING COLUMN
Filed Jan. 31, 1927
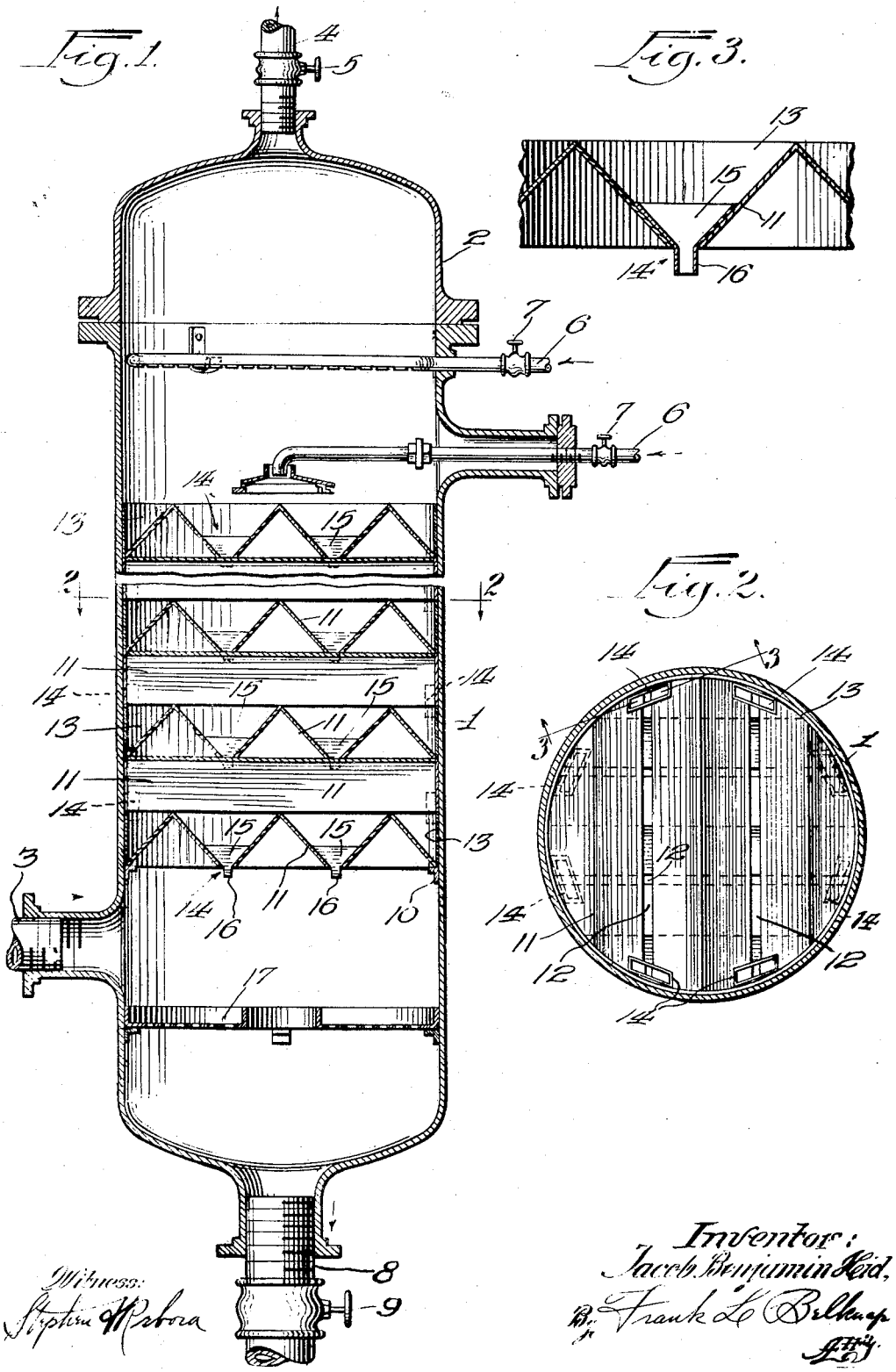
Inventor:
Jacob Benjamin Heid,
By Frank L. Belknap
Atty.

Patented June 23, 1931

1,811,627

UNITED STATES PATENT OFFICE

JACOB BENJAMIN HEID, OF CHICAGO, ILLINOIS, ASSIGNOR TO UNIVERSAL OIL PRODUCTS COMPANY, OF CHICAGO, ILLINOIS, A CORPORATION OF SOUTH DAKOTA

FRACTIONATING COLUMN

Application filed January 31, 1927. Serial No. 164,990.

The present improvements relate more particularly to a scientifically designed fractionating column wherein fractional distillation of hydrocarbon vapors may be effected. The fractional distillation may be carried out under atmospheric pressure or under superatmospheric pressure, or subatmospheric pressure.

It is well known in the art that in the distillation of hydrocarbon vapors they contain light and heavy fractions, and the purpose of my invention is to effect a separation of these low and high boiling point fractions, passing the lighter boiling point hydrocarbons out in the form of vapors to a condenser, and the heavy hydrocarbons in the form of reflux condensate back into the system for retreatment. The best fractionation is secured by providing for as intimate a contact between the vapors and the cooling medium as is possible.

To secure this intimate contact I have designed a fractionating column in which inverted V-type plates or angle plates, the lower edges of which are slightly spaced from adjacent plates whereby pools of reflux condensate may collect at spaced heights in a column, being subjected to a reboiling action by the ascending vapors, while at the same time providing for intimate contact between the descending liquid and ascending vapors. The present arrangement will efficiently take care of surplus reflux and allow an even temperature change between the spaced plates.

As a feature of the invention, in case the ascending vapors should cause the descending liquid to build up on any plate, overflow means are provided whereby this liquid may pass to a lower plate, and be built to a point at which it will collect and be subjected to a reboiling action from the ascending vapors striking a point below that pool.

The utility of the invention as well as other objects, features and advantages will be more particularly brought out in the following description.

In the drawings, Fig. 1 is a vertical sectional view of a fractionating tower according to the present invention.

Fig. 2 is a cross sectional view taken on line 2—2 of Fig. 1.

Fig. 3 is a fragmentary cross sectional view taken on line 3—3 of Fig. 2.

Referring more in detail to the drawings, 1 designates an elongated metal shell disposed vertically, which has a removable upper closure cap 2. The column 1 is adapted to be connected and included as part of an apparatus wherein hydrocarbons are subjected to distillation or cracking. The released vapors pass through the vapor inlet pipe 3, controlled by a suitable valve (not shown), into the interior of the column and preferably adjacent the lower end thereof. The vapors remaining uncondensed after passing through the column pass out through the vapor outlet pipe 4, in which may be interposed the valve 5. Cooling liquid, which may take the form of charging stock, distillate, or any other suitable cooling medium may be introduced through either or both of the inlet pipes 6, in which may be interposed valves 7. The reflux condensate and unvaporized liquid may be withdrawn through the liquid outlet 8 in which may be interposed the valve 9 connecting to the bottom of the dephlegmator.

Describing now the device of the present invention, suitably supported, for instance on the lugs 10, are a number of spaced plates 11 each preferably taking the form of an inverted V, as indicated. A number of these plates 11 are disposed side by side to constitute one layer. The lower edges of adjacent plates are spaced from each other (Fig. 2) as indicated at 12, the width of this space being so controlled as to permit vapors entering the pipe 3 to ascend, and liquid to descend without danger of channelling of either liquid or vapors. A similar layer of plates of similar design is disposed immediately above the first mentioned layer but alternate thereto, the bases or lower edges of said plates resting on and being supported by the ridges of the plates below, as clearly indicated in Figs. 1 and 2. Each layer may, if desired, be provided with an annular side wall 13 to prevent ascending vapors and descending condensate from channelling around the edges of each plate. The edge of each outside plate directly adjacent the wall of shell 1 is rounded to conform to the curvature of said shell and prevents any channelling spaces.

Due to the high velocity of the ascending vapors through the spaces 12, the descending liquid may surge or build up its level. To permit free passage of said descending liquid to the layer below, I have placed overflow pipes 14 at the outside edges of the plates, which overflow pipes comprise an upper extension 15 and lower extension 16, the height of the extension 15 being so controlled as to regulate the liquid level, and the downwardly extending projection 16 being only long enough to deliver the liquid to the plate below. This arrangement will take care of all surplus liquid and allow an even temperature between plates. The plates of each layer can be made of steel and can be cast in one or several sections. The number of plates 11 which may comprise a layer and the particular arrangement of alternately arranging the plates may be changed as should be obvious.

As a feature of the present invention, it is to be noted that the overflow pipes 14 are positioned immediately adjacent the wall of the shell 1 so that descending liquid will be delivered into the pocket formed between the side of the shell and ridge of that plate, permitting heat of ascending vapors in contact with the lower surfaces of the plates to be transferred to this liquid body, resulting in a reboiling and a release of the light fractions it may contain. The arrangement can be changed so that the ridge of one plate will be opposite the valley of the second layer, or the ridges of all plates in alternate layers can be set in place so that they parallel each other or run at right angles to each other. It is to be noted that there is an increase and decrease in the velocity of the ascending vapors as they successively pass through each of the spaces 12 and surrounding larger space. This action causes the vapors to ascend in more or less a tortuous path giving up the heavier particles against the surfaces of the plates 11. The descending reflux condensate falls on the top of each plate 11 and moves by gravity to the slot 12 where it intimately mixes with the vapors causing severe agitation between the vapors and reflux condensate, and at the same time heat from ascending vapors contacting the lower walls of each plate will reboil the filmy surface of reflux condensate flowing down the top surfaces of each plate.

A perforated tray 17 may be placed below the vapor inlet so that lighter fractions entrained in the reflux may have an opportunity to be relieved of said light fractions before passing into the liquid draw off 8.

I claim as my invention:

1. A dephlegmator comprising a shell having a vapor inlet and outlet and a liquid outlet, a plurality of vertically disposed layers of inverted V-shaped baffle elements within said shell, the elements of each layer being spaced to provide passages therebetween and the elements in one layer being arranged transversely with respect to the elements in the adjacent layer, and liquid overflow members positioned in said passages.

2. A dephlegmator comprising a shell having a vapor inlet and outlet and a liquid outlet, a plurality of vertically disposed layers of inverted V-shaped baffle elements within said shell, the elements of each layer being spaced to provide passages therebetween and the elements in one layer being arranged transversely with respect to the elements in the adjacent layer, and liquid overflow members positioned in said passages adjacent the shell wall.

3. A dephlegmator comprising a shell having a vapor inlet and outlet and a liquid outlet, a plurality of vertically disposed layers of inverted V-shaped baffle elements within said shell, the elements of each layer being spaced to provide passages therebetween and the elements in one layer being arranged transversely with respect to the elements in the adjacent layer, and funnel-shaped liquid overflows positioned between said elements and discharging thru said passages.

4. A dephlegmator comprising a shell having a vapor inlet and outlet and a liquid outlet, a plurality of vertically disposed layers of inverted V-shaped baffle elements within said shell, the elements of each layer being spaced to provide passages therebetween and the elements in one layer being arranged transversely with respect to the elements in the adjacent layer, and funnel-shaped liquid overflows positioned between said elements adjacent the shell wall and discharging thru said passages.

JACOB BENJAMIN HEID.